United States Patent [19]

Huemer

[11] Patent Number: 4,627,583

[45] Date of Patent: Dec. 9, 1986

[54] WINDING EQUIPMENT

[76] Inventor: Franz X. Huemer, Sonnenuhrgasse 4, 1060 Vienna, Austria

[21] Appl. No.: 762,158

[22] Filed: Aug. 2, 1985

[30] Foreign Application Priority Data

Aug. 30, 1984 [CH] Switzerland ............... 04150/84

[51] Int. Cl.$^4$ ............................................. B65H 59/38
[52] U.S. Cl. .................................. 242/45; 242/75.51; 310/103
[58] Field of Search ............... 242/45, 155 M, 75.5, 242/75.51; 226/42, 44, 45, 24, 10; 310/92, 103, 105

[56] References Cited

U.S. PATENT DOCUMENTS

| 2,026,155 | 12/1935 | Abbott | 242/45 X |
| 2,175,551 | 10/1939 | Perry | 242/75.5 |
| 2,254,221 | 9/1941 | Hubbard | 242/25 R |
| 2,608,355 | 8/1952 | Bell et al. | 242/45 |
| 2,688,789 | 9/1954 | Duryee | 242/155 M X |
| 2,722,617 | 11/1955 | Cluwen et al. | 310/103 |
| 3,072,361 | 1/1963 | Fuller | 242/155 M |
| 3,113,228 | 12/1963 | Tolegian | 310/103 |
| 3,137,452 | 6/1964 | Winders | 242/45 X |
| 3,523,204 | 8/1970 | Rand | 310/103 X |
| 4,327,873 | 5/1982 | Juppet et al. | 242/45 |

FOREIGN PATENT DOCUMENTS

| 1176203 | 11/1958 | France | 242/45 |
| 589529 | 6/1947 | United Kingdom | 242/45 |
| 594540 | 11/1947 | United Kingdom | 242/45 |
| 858063 | 1/1961 | United Kingdom | 242/45 |
| 1250759 | 10/1971 | United Kingdom | 242/45 |

Primary Examiner—Stanley N. Gilreath
Attorney, Agent, or Firm—Karl F. Ross; Herbert Dubno

[57] ABSTRACT

The winding equipment for winding yarn, tape or wire-shaped material comprises a bobbin shaft carrying a rotatably fixed armature plate, which is in magnetic, adjustable driving connection with a plate carrying permanent magnets and fixed on the shaft of the driving motor, the adjustment thereof resulting by a thread tension regulating device with a dancing arm carrying a dancing roller. In this connection, the motor or the shaft thereof carrying the permanent magnet plate is supported relative to the bobbin shaft carrying the armature plate radially displaceable as a function of the rotating motion of the dancing arm on the frame of the winding equipment. Owing to this radial displacement of the plates generating the driving connection, relative to each other, not only is the induced magnetic field changed in the simplest manner, but, in addition, the two plates can be arranged with the slightest air gap between each other, which, accordingly, allows for the utilization of small permanent magnets to secure a sufficient magnetic driving connection between the two plates.

4 Claims, 2 Drawing Figures

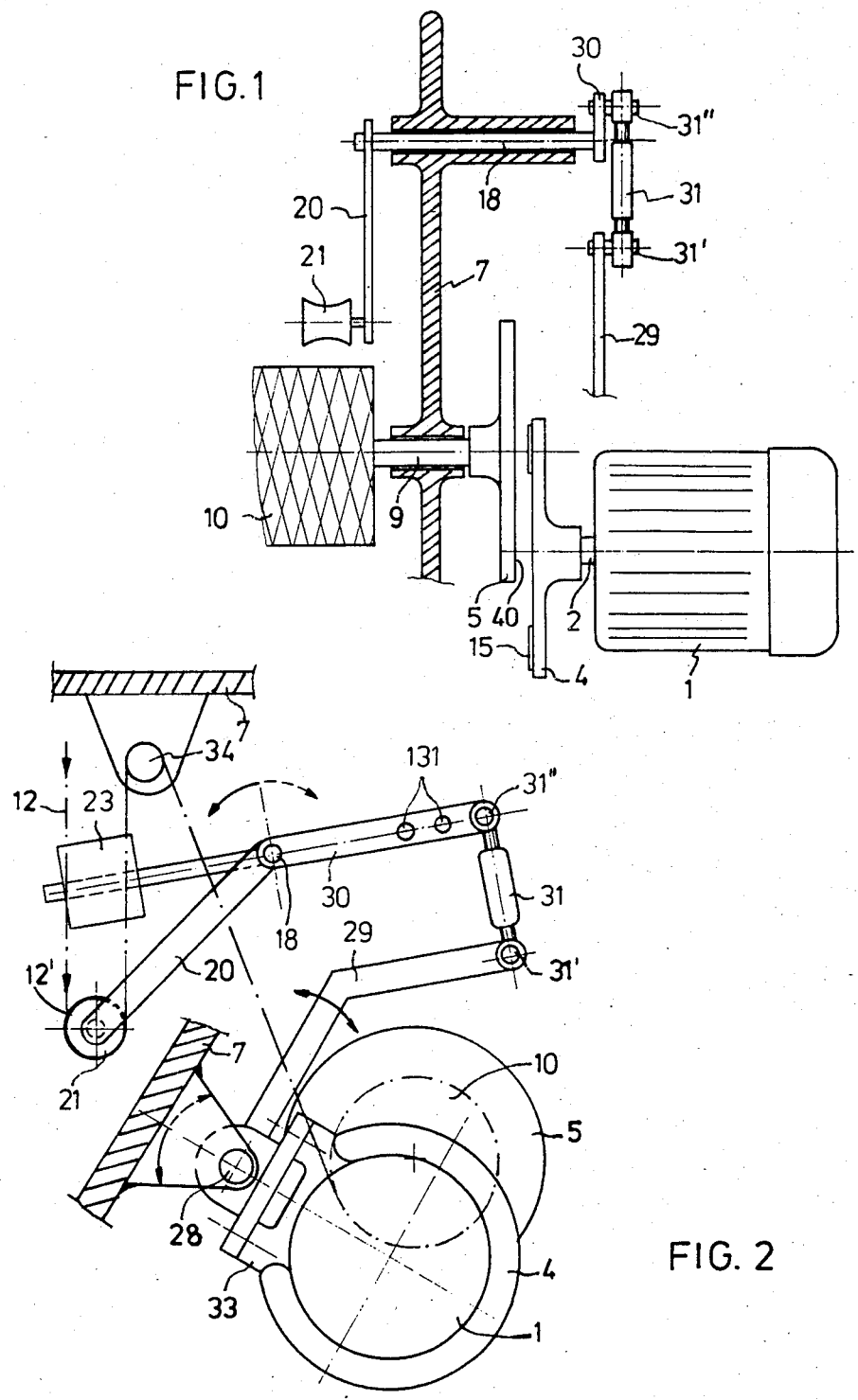

WINDING EQUIPMENT

FIELD OF THE INVENTION

The present invention relates to a winder for winding yarn, tape or wire-shaped material, with the bobbin shaft thereof carrying a rotatable armature plate, which is in magnetic, adjustable driving connection with a plate carrying permanent magnets and mounted to rotate with the shaft of the driving motor, the adjustment thereof taking place by a thread tension regulating device with a dancing arm carrying a dancing roller.

BACKGROUND OF THE INVENTION

A winder of the aforesaid kind, for instance for winding thread, yard, twist yarn, slit film or tape and the like, is expected to wind up the total delivered material completely and without delay. Owing to the fact that the amount of the supplied material is subject to great variations, manifested by a change of the thread tension, the rotatable speed of the take-up bobbin is in a generally-known manner readjustable by means of a thread tension regulating device, with the magnetic field between the motor-driven permanent magnet plate and the armature plate on the bobbin side being changed, whereby a more or less strong driving connection from the motor to the bobbin exists.

To change the magnetic field between the motor-driven permanent magnet plate and the armature plate at the bobbin side of the drive, it has been proposed to change the clearance between them. This, however, requires an axially displaceable positioning of either the driving motor or the winding arrangement, which is expensive.

Further, an arrangement of the aforesaid kind is known, wherein the two plates are arranged with a fixed axial distance to each other, with a shield of ferromagnetic material being pushed in the axial gap between these, thereby deflecting or shielding a part of the induced magnetic field.

Such an arrangement possesses considerable disadvantages, however, since the shield must be relatively thick so as not to bend under the effect of the magnetic field forces. This on the other hand requires a relatively wide air gap between the plates and relatively large permanent magnets to be able to generate a sufficient force field. This, however, increases the price of the whole arrangment not inconsiderably.

OBJECT OF THE INVENTION

It is therefore an object of the present invention to provide a winder of the aforementioned kind, which permits a sequentially exact control of the bobbin speed as a function of the tension of the materials supplied, with least expenditure for materials, in particular for the magnetic means, without the disadvantages inherent in the prior art.

SUMMARY OF THE INVENTION

This is achieved according to invention in that the motor or the shaft thereof carrying the permanent magnet plate is supported relative to the bobbin shaft carrying the armature plate so as to be radially displaceable as a function of the rotating motion of the dancing arm on the frame of the winding equipment.

Owing to this radial displacement of the plates generating the driving connection, relative to each other, not only is the induced magnetic field changed in the simplest manner, but, in addition, the two plates can be arranged with the slightest air gap between each other, which, accordingly, allows for the utilization of small permanent magnets to secure a sufficient magnetic driving connection between the two plates. This arrangement is, hence, not only inexpensive, but also absolutely operationally safe.

For a robust construction, an advantageous embodiment of the winding equipment according to invention provides that the motor is rotatable axially parallel to its shaft around a swivelling supported pivot on the frame of the winding equipment, on which pivot the free end of a rocking lever is rotatably fixed; the other end of this lever is flexibly connected to the free end of an extension of the dancing arm. It is advantageous to have a bearing eye mounted rotatably fixed on the pivot and extending radially from the motor.

To permit a variable transmission ratio between the dancing-arm movement and the displacement of the plates generating the driving connection, it is of advantage if the flexible connection between the rocking lever and the extension of the dancing arm results from an adustable connecting rod, whereby, it is of constructional advantage if the extension is mounted rotatably fixed on the rotatably support shaft of the dancing arm on the frame of the winding equipment.

BRIEF DESCRIPTION OF THE DRAWING

An embodiment of the present invention will now be more particularly described by way of example and with reference to the accompanying drawings, in which:

FIG. 1 is a schematic representation of a side view, partially in section, of the winding equipment according to invention; and FIG. 2 is a schematic representation of a front view of the arrangement according to FIG. 1, whereby, for better understanding, the frame part of the winding equipment according to FIG. 1 has been omitted.

SPECIFIC DESCRIPTION

The winder shown in the drawing comprises a driving motor 1, on the shaft 2 of which a plate 4 of suitable material is mounted rotatably fixed, i.e. so as to rotate with the shaft 2. This plate 4 carries as a rule rod-shaped permanent magnets 15 with alternating polarity on its outer front side near the edge and spaced from each other.

Arranged opposite this permanent magnet plate 4, with a slight clearance 40, is a so-called armature plate 5 which sits on a bobbin shaft 9, which is rotatably supported in a suitable manner on the frame 7 of the winding equipment. On the free end of this bobbin shaft 9 a bobbin 10 is attachable, onto which, thread, tape or wire-shaped material may be wound.

When the permanent magnet plate 4 is set in rotation by the motor 1 of the winding equipment as known thus far, a magnetic field is generated which causes an eddy current in the armature plate 5 and drives this with it in the direction of rotation, through which the bobbin 10 is driven and the material 12 is would up.

In order to now be able to control this driving connection by a thread tension regulating device, the arriving material 12 is passed as a loop 12' around a so-called dancing roller 21. The dancing arm 20 carrying this roller is mounted with its other end rotatably fixed on a shaft 18, which is supported so as to be rotatable in a suitable manner in said frame 7. This arrangement stands, thereby, under the effect of a spring or, as shown, a counterweight 23. When more material 12 is supplied, so the tension of the material sinks, the dancing arm 20 in FIG. 2 is swung counterclockwise; at increased material tension the arm 20 is swung against the effect of the counterweight 23 clockwise, its fulcrum being the shaft 18.

According to FIG. 2, the material passes after the dancing roller 21 over an idler roller 34 on the frame 7 onto the bobbin 10.

For readjusting the specified magnetic driving connection between the motor 1 and the bobbin 10 as a function of the dancing arm 20 moved by the tension of the material, the motor 1 is mounted for radial displacement with its permanent magnet plate 4 supported relative to the armature plate 5 of the bobbin shaft 9 as a function of the angular displacement of the dancing arm 20 on the frame 7 of the winding equipment. This support results by way of a pivot 28 axially parallel to the shaft 2 of the motor, on which pivot the motor 1 is mounted rotatably fixed, with a bearing eye 33 extending radially from the motor block. The pivot 28 is supported in a suitable manner so as to rotate on the frame 7.

For displacement of the motor 1 and the permanent magnet plate 4 relative to the armature plate 5 of the bobbin shaft 9 as a function of the rotating motion of the dancing arm 20, a compound lever arrangement is provided which comprises a rocking lever 29 which is rotatably fixed on the pivot 28 of the motor 1. The other end of this rocking lever 29 is pivotally connected to an extension 30 of arm 20 by a connecting rod 31, the extension 30 being fixed at its other end to the shaft 18 of the dancing arm 20 rotatably supported on the frame 7.

In this manner, a relatively simple, operationally-safe arrangement is achieved, which ensures functionally exact relative displacement between the two magnetic coupling plates 4 and 5 in accordance with the angular displacement of the dancing arm 20.

When a clockwise tilting of the dancing arm 20 occurs, for example, owing to increased material tension, the extension 30 and the rocking lever 29 follow this movement so that the motor 1 also tilts clockwise, and the permanent magnet plate 4 is moved radially out of its original coaxial position with the armature plate 5. Since the effective magnetic field is thereby weakend, the bobbin 10 rotates more slowly until the material tension eases and the displacement of the assembly is reversed.

Of course, the underlying idea of the invention is not confined only to the previously described specific embodiments, but a series of modifications are easily possible.

For example, the transmission ratio between dancing arm 20 and rocking lever 29 can be varied by constructing the articulated pins 30' and/or 31" of the connecting rod 31 stepwise movable, as is indicated on the dancing arm extension 30 by bearing bores 131. Furthermore, the relative radial displacement between the two plates can also be achieved by a sliding displacement of the motor. Moreover, through a suitable arrangement, the dancing arm can also be employed directly for swivelling or otherwise displacing the motor. In addition to this, the arrangment can be such that additional weight or spring means generating a counterforce on the dancing arm are unnecessary.

While there are shown and described present preferred embodiments of the invention, it is to be distinctly understood that the invention is not limited thereto, but may be otherwise variously embodied and practiced within the scope of the following claims.

Accordingly, what I claim is:

1. A yarn winder which comprises:

a winder frame;

a bobbin shaft journaled on said frame and carrying a bobbin upon which a yarn is to be wound;

a driven plate mounted on an end of said bobbin shaft;

an electric motor having a drive shaft parallel to said bobbin shaft;

a drive plate on said drive shaft juxtaposable with said driven plate and magnetically couplable therewith to rotate said bobbin when said motor is energized, one of said plates being provided with permanent magnets, the other of said plates being composed of a magnetically permeable material for magnetic coupling with said permanent magnets;

support means for pivotally mounting said drive shaft for angular displacement about a pivot axis parallel to said shafts but offset from said drive shaft to displace said drive plate generally radially with respect to said driven plate to vary the magnetic coupling between said plates;

a dancing arm swingably mounted on said frame and provided with a dancing roller about which a loop of said yarn passes and forming a yarn-tension detector; and means coupling said arm with said support means for swinging said drive shaft about said pivot axis to decrease said magnetic coupling by a said generally radial displacement of said drive plate in one direction upon an increase in yarn tension and to increase said magnetic coupling by a reverse generally radial displacement of said drive plate.

2. The yard winder defined in claim 1 wherein said means coupling said arm with said support means includes a lever angularly displaceable with said arm and having a free end connected to said support means by an adjustable rod.

3. The yard winder defined in claim 2 wherein said lever is fixed to a pivot shaft carrying said arm.

4. The yard winder defined in claim 1 wherein said support means includes a bearing eye journaled on said pivot axis and extending radially from said motor.

* * * * *